UNITED STATES PATENT OFFICE.

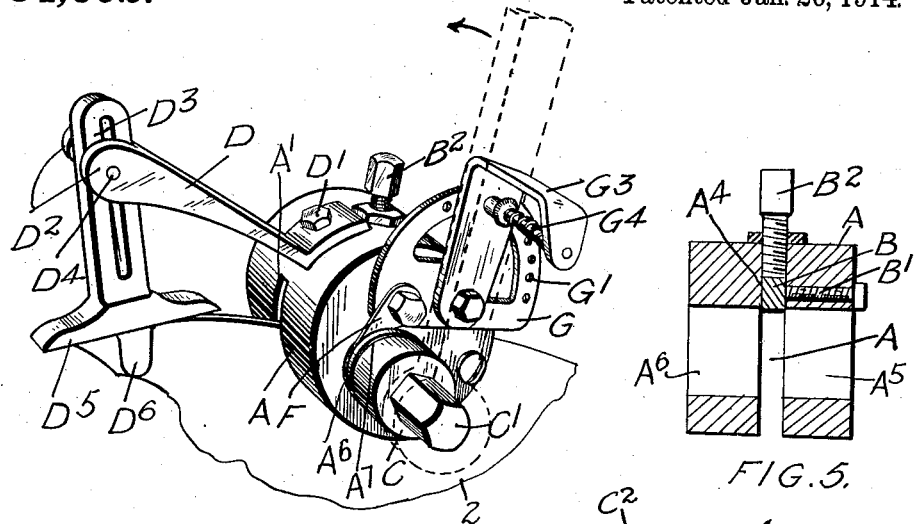
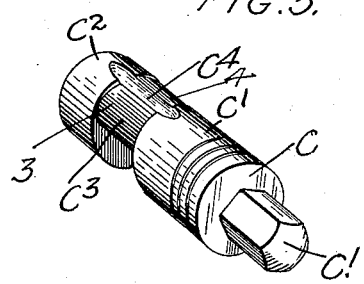
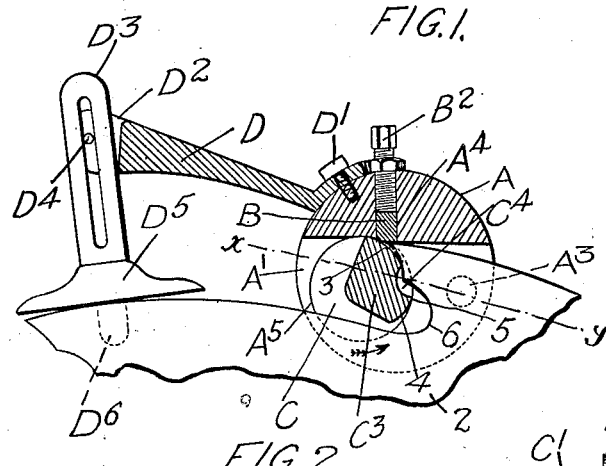
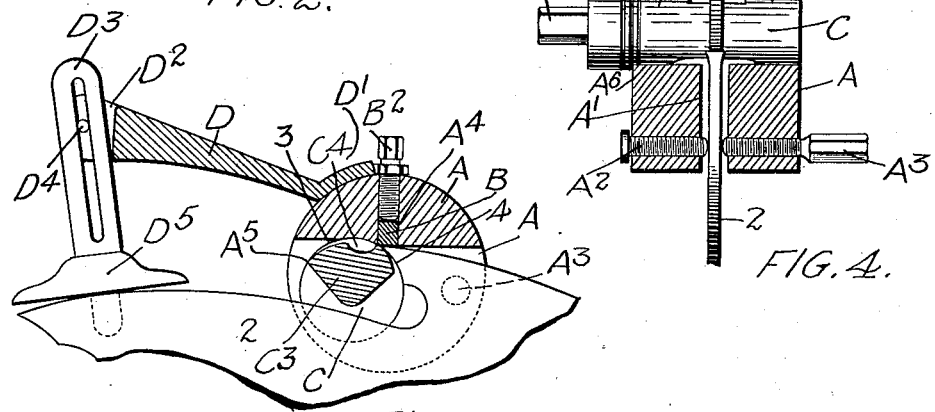

DANIEL MARTIN BOWMAN, OF FLORADALE, ONTARIO, CANADA.

SAW-TOOTH-RESHAPING DEVICE.

1,084,602. Specification of Letters Patent. Patented Jan. 20, 1914.

Application filed June 4, 1913. Serial No. 771,653.

*To all whom it may concern:*

Be it known that I, DANIEL MARTIN BOWMAN, of the village of Floradale, in the county of Waterloo, in the Province of Ontario, Canada, have invented certain new and useful Improvements in Saw-Tooth-Reshaping Devices, of which the following is the specification.

My invention relates to improvements in saw tooth re-shaping devices and the object of the invention is to devise a simple device which will quickly re-shape a tooth and give it its proper cutting quality, and dispense with the long and tedious operation of filing and at the same time insure of the edge of the tooth being cut perfectly true by an inexperienced person and which will be adapted to re-shape any size of tooth, and it consists essentially of a supporting member having grooves formed therein, an anvil block held at the base of the slot and against which the end of the tooth is designed to bear, a cutting cylinder held in the securing member and having a cutting edge carried thereby designed to engage the tooth at the gum of the tooth to cut in an upwardly curved direction to the point as hereinafter more particularly described by the following specification.

Figure 1, is a perspective view of my device as applied to a circular saw. Fig. 2, is a sectional view through Fig. 1, with the device in the position previous to cutting the tooth. Fig. 3, is a similar view to Fig. 2, with the device in the position it will assume after re-shaping the tooth. Fig. 4, is a sectional view on line $x-y$ Fig. 2. Fig. 5, is a sectional detail of the securing members. Fig. 6, is an enlarged perspective detail of the cutting member.

In the drawings like letters of reference indicate corresponding parts in each figure.

A is a supporting member provided with a cross slot $A'$ extending partially through such member.

$A^2$ and $A^3$ are clamping screws extending through the body of the securing member into the slot $A'$.

2 is the saw.

$A^4$ is a recess formed in the securing member at the base of the slot $A'$.

B is an anvil block held in the recess $A^4$ and secured therein by the set screw $B'$.

$B^2$ is an adjusting screw bearing at its inner end against the block B, whereby the block is adjusted more or less inwardly into the slot $A'$.

$A^5$ and $A^6$ are bores extending through each end of the securing cylinder A into the slot $A'$.

C is a cylindrical cutting member held within the bores $A^5$ and $A^6$ provided at its projecting end with grooves $A^7$. The cutting member C is provided with a nut shaped end $C'$ on which is slipped a suitable lever for turning the cutting member. The cutting member C comprises two bearing portions $C'$ and $C^2$ connected together by segmental portion $C^3$ in the periphery of which is formed cross groove $C^4$. That portion 3 of the periphery above the groove is formed eccentric to the center of the cylinder thereby forming one side of the groove higher than the other. That portion of the periphery on the opposite side of the groove is also formed eccentric to the center of the cutting member at 4 so as to produce a sharp cutting edge.

D is an arm secured by the screw $D'$ to the supporting member A, the arm D is provided with a divided end $D^2$.

$D^3$ is a longitudinally slotted bar connected to the divided portion $D^2$ of the arm D by the cross pin $D^4$ extending through the divided arm and the longitudinal slot of the bar $D^3$ is provided with an enlargement $D^5$ bearing against the periphery of the next adjacent tooth to the one being reshaped.

$D^6$ are lugs extending from the enlargement $D^5$ to each side of the saw tooth.

F is a finger secured to the securing member A and designed to extend into one of the grooves $A^7$.

G is a bracket also secured to the end of the securing member provided with an arc-shaped series of holes $G'$.

$G^3$ is a finger secured to the bracket G at the center of the arc-shaped series of holes $G'$.

$G^4$ is a spring plunger carried by the stop finger $G^3$ so as to engage one series of the holes $G'$.

Having described the principal parts involved in my invention I will briefly describe the operation of the same. The securing member A is placed over the saw tooth so that the tooth extends into the slot $A'$ against the anvil block B, the tooth being secured in place by the set screws A² and A³. The base of the tooth next to the gum recess 6 extends into the grooves C⁴. The cutting member C is also provided with an operating lever which is thrown in the direction of the arrow. The cutting edge 5 then engages the base of the tooth, cutting upwardly in an arc-shaped direction toward the point of the tooth thereby undercutting the tooth on the dotted lines coinciding with the periphery of the cylindrical portion of the cutting member. In order to adjust my device to any depth of cut, I have provided a stop finger G³ hereinbefore described. By adjusting this finger by means of the spring plunger G⁴ and one of the holes G' I am enabled to adjust the initial position of the lever and consequently the position of the eccentric 3 and cross grooves C⁴ in relation to the anvil block D so that the angular space between the anvil block and the cutting member is adjusted to regulate the distance of the point of the tooth from the center of the cutting member and thereby cut to a greater or less depth when the cutting member is turned in the right position for cutting. If the cutting edge 5 becomes worn the cutting member may be moved longitudinally and secured in place by the finger F entering another groove A⁷ thereby presenting a new portion of the cutting edge of the saw tooth.

From this description it will be seen that I have devised a device which will cut the front of the tooth absolutely true, that is to say at right angles to the side faces of the saw, in which the long tedius operation of filing the tooth into its proper shape is dispensed with and such that the tooth may be re-shaped by any inexperienced workman so that it will be assured of having its proper cutting qualities. By my device also a sufficient hook is given to the tooth whereby the saw may be driven with much less power and the capacity of the saw increased without weakening the tooth as would be the case of the tooth where given its hook shape by means of a flat file.

What I claim as my invention is.

1. A saw tooth re-shaping device comprising a supporting member resting on the periphery of the saw and secured thereto, and forming a bearing surface for the point of the tooth, a rotary cylindrical cutting member having a longitudinal groove and eccentric surfaces extending from each side of the groove so as to form a cutting edge on one side of the groove, and whereby the depth of the cut is regulated, and means for turning the cutting member to undercut the tooth from the gum recess to the point, as and for the purpose specified.

2. In a saw tooth re-shaping device having a supporting member resting on the periphery of the saw and secured thereto and forming a bearing surface for the tooth, a rotary cutting member for undercutting the tooth, means carried by the cutting member for regulating the depth of the cut and means for rotating the cutting member.

3. A saw tooth re-shaping device comprising a supporting member having a cross slot extending to each side of the saw teeth, means for holding the supporting member in a stationary position in relation to the saw, a rotary cutting member, an operating lever for the same, a pivoted inverted L-shaped supporting finger, a plate carried by the supporting member having an arc-shaped series of holes, and a spring plunger carried between the arms of the L and designed to co-act with the series of holes whereby the finger may be adjusted to support the lever in the required position, as and for the purpose specified.

DANIEL MARTIN BOWMAN.

Witnesses:
B. BOYD,
E. H. WALKER.